United States Patent [19]

Ridgway

[11] 3,957,735
[45] May 18, 1976

[54] FIBER-FORMING POLYHYDRAZIDES
[75] Inventor: James S. Ridgway, Pensacola, Fla.
[73] Assignee: Monsanto Company, St. Louis, Mo.
[22] Filed: Apr. 29, 1975
[21] Appl. No.: 572,787

Related U.S. Application Data
[63] Continuation-in-part of Ser. No. 506,376, Sept. 16, 1974, abandoned.

[52] U.S. Cl.............................. 260/78 TF; 260/30.2; 260/32.6 N
[51] Int. Cl.$^2$.......................................... C08G 73/08
[58] Field of Search ....................... 260/78 TF, 78 R

[56] References Cited
UNITED STATES PATENTS

| | | | |
|---|---|---|---|
| 3,130,182 | 4/1964 | Frazer | 260/78 |
| 3,130,183 | 4/1964 | Frazer | 260/78 |
| 3,238,183 | 3/1966 | Frazer | 260/78.4 |
| 3,632,548 | 1/1972 | Raleigh | 260/32.6 N |
| 3,642,707 | 2/1972 | Frazer | 260/78 |
| 3,748,298 | 7/1973 | Dobinson et al. | 260/32.6 NA |
| 3,787,348 | 1/1974 | Dobinson et al. | 260/32.6 NA |

*Primary Examiner*—Lester L. Lee
*Attorney, Agent, or Firm*—John W. Whisler

[57] ABSTRACT

Fiber-forming polyhydrazides prepared from oxalic dihydrazide, terephthalic dihydrazide, malonic dihydrazide and terephthaloyl chloride are provided. Yarns made from these polyhydrazides are useful in tire cord applications and retain greater tenacity when plied into cord than yarns made from corresponding polyhydrazides from which the malonic dihydrazide has been omitted.

4 Claims, No Drawings

FIBER-FORMING POLYHYDRAZIDES

RELATED APPLICATIONS

This application is a continuation-in-part of U.S. application Ser. No. 506,376, filed Sept. 16, 1974, and now abandoned.

BACKGROUND OF THE INVENTION

1. Field of the Invention

This invention relates to novel fiber-forming polyhydrazides and to useful yarns made therefrom.

2. Description of the Prior Art

U.S. Pat. No. 3,748,298 describes continuous filament yarns prepared from polyhydrazides consisting essentially of recurring structural units of the formulas (I) and (II)

(I)
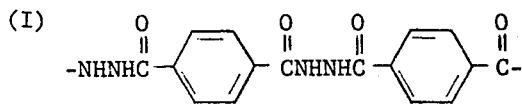

and (II)
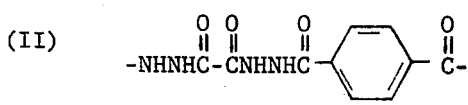

in a mole ratio of from 9:1 to 1:9. Tire cord may be made from these yarns in a conventional manner, wherein two or more of the yarns are each twisted a predetermined number of turns per inch (tpi) in one direction (e.g., a clockwise direction) and then plied a substantially corresponding number of tpi in the opposite direction to provide a balanced and highly twisted structure.

The twist in a cord structure gives the cord the ability to absorb compression forces and withstand fatigue. It is well known that the fatigue resistance of a cord increases with increasing twist in the cord structure to a maximum value and thereafter decreases with any further increase in twist. For a given type of yarn such as nylon, polyester or polyhydrazide yarn the amount of twist required to reach this maximum value depends on the size or denier of the yarns. In order to express this amount of twist in yarns of different denier, it is common to use a quantitative index known as a twist multiplier (TM). The twist multiplier for a given type of yarn is determined by the following formula:

$$TM = 0.01372 \, T \sqrt{\frac{D}{Sp. \, Gr.}}$$

where: T is twist in yarn, expressed as turns per inch (tpi); D is total denier of the untwisted yarn in the cord; and Sp. Gr. is specific gravity of the yarn. The derivation of the above formula is described in U.S. Pat. No. 3,233,648.

It is also well known that the strength of a cord in terms of its tenacity decreases with increasing twist in the cord structure. Therefore, tire cords normally will contain the minimum amount of twist necessary to provide a cord of acceptable fatigue resistance. Thus, for a given tire yarn there is an optimum twist multiplier ($TM_o$) which will provide a cord having an optimum balance of properties with regard to fatigue resistance and tenacity for its particular end use in a tire. In this way the loss of tenacity resulting from twisting the yarns will be minimized. Naturally, the optimum twist multiplier ($TM_o$) has a lower value and involves less twist than the twist multiplier (TM) that is used to provide cord with maximum fatigue resistance.

It has been found that when yarns of the polyhydrazides described in U.S. Pat. No. 3,748,248 are plied (i.e., twisted) into cord using the OTM of 6.89, the tenacity of the resulting cord is less than half that of any of the untwisted yarns. The twist efficiency of yarns in terms of percent tenacity retained ($T_R$) upon yarn-to-cord conversion is an important characteristic of yarns used in making cords and may be represented by the following equation:

$$T_R = \frac{Cord \, Tenacity}{Yarn \, Tenacity} \times 100$$

It is an object of the present invention to provide novel polyhydrazides and yarns prepared therefrom having $T_R$ values greater than about 55%.

SUMMARY OF THE INVENTION

The present invention provides fiber-forming polyhydrazides consisting essentially of recurring structural units of the formulas (I)
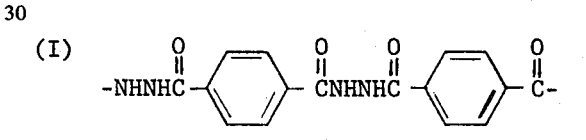

(II)

and (III)
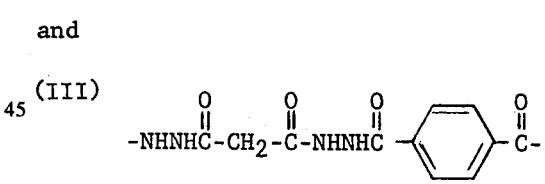

wherein the mole ratio of units (I) to the sum of units (II) and (III) is from 1:9 to 9:1 and the mole ratio of units (III) to the sum of units (I) and (II) is from 3:97 to 15:85.

Yarns made from polyhydrazides of the present invention have a twist efficiency in terms of percent tenacity retained ($T_R$) upon yarn-to-cord conversion of greater than 55%.

DESCRIPTION OF THE PREFERRED EMBODIMENTS

Yarn Preparation

The yarns described herein may be made by the coupled process described in U.S. Pat. No. 3,748,298, wherein the co-monomers, terephthalic dihydrazide (TDH), oxalic dihydrazide (ODH), malonic dihydrazide (MDH) and terephthaloyl chloride (TCl) are copolymerized in N,N-dimethylacetamide (DMAc) containing lithium chloride (LiCl), for example 5% by weight, based on the weight of DMAc, at a temperature of between −20°C. and 50°C. with continual stirring of the reaction mixture until the resulting polymer has an inherent viscosity ($\eta_{inh}$) of at least 2.0 and preferably between 6.0 and 12.0, when measured at 25°C. using a concentration of 0.5 gram of polymer per 100 ml of DMAc/5% LiCl, obtained by dilution of a portion of the reaction mixture. The mole ratio of co-monomers may range from 9:1 to 1:9, ODH + MDH:TDH with the mole ratio of dihydrazides to TCl being substantially 1:1; the mole ratio of MDH to ODH + TDH may vary from 3.97 to 15.85, respectively. Instead of DMAc, N-methylpyrrolidone-2 (NMP) or a mixture of DMAc and NMP may be used. The resulting viscous solution (dope) is then neutralized with, for example, lithium hydroxide hydrate, and a small amount of water, as a stabilizer, added thereto with continued stirring to provide a clear dope. This solution (dope) may then be wet spun into yarn using conventional wet spinning techniques such as that described in U.S. Pat. No. 3,748,298.

The polyhydrazides of this invention consist essentially of recurring structural units of which at least 10 mole percent are units (I), 7 mole percent are units (II) and 3 mole percent are units (III). Units (I) are formed from TDH and TCl, units (II) are formed from MDH and TCl. Polyhydrazides of the invention which are particularly useful in producing yarns having good retention of tenacity when plied into cord are prepared from substantially equimolar amounts of TCl and a mixture of ODH, MDH and TDH wherein the mole ratio of ODH + MDH to TDH is between 40:60 and 60:40 with a mole ratio of about 50:50 being particularly preferred.

Measurements and Tests

Inherent Viscosity: Inherent viscosity ($\eta_{inh}$), measured at 25°C., is defined by the following equation:

$$\eta_{inh} = \frac{\ln RV}{C}$$

where C is the concentration (0.5 gram of the polymer per 100 ml. of solvent) of the polymer solution and RV (relative viscosity) is the ratio between the flow times of the polymer solution and the solvent as measured in a capillary viscometer. The polymer solution used for the $\eta_{inh}$ determinations is obtained by dilution of a portion of the reaction product, formed in the preparation of the polymer.

Tenacity (breaking tenacity) (T) and elongation (breaking elongation) (E) are obtained on an Instron tester (Instron Engineering Corp., Canton, Mass.) providing a constant rate of extension of 60%/minute with a gauge length of 25 cm being used. The measured denier of the yarn or cord sample, test conditions and sample identifications are fed to a computer before the start of the test. The computer records the load-elongation curve of the sample until it is broken, calculates the T and E of the sample from the curve and fed information and provides a printout sheet with the calculated T and E values recorded thereon.

The following nonlimitive examples are given to further illustrate the invention.

EXAMPLE I

This example illustrates the preparation of yarn of a polyhydrazide consisting of the condensation product of TCl, ODH, TDH and malonic dihydrazide (MDH), wherein the mole ratio of TCl to ODH + MDH + TDH is substantially 1:1 and the mole ratio of ODH to MDH to TDH is 40:10:50.

To a flame-dried 4 liter resin kettle equipped with $N_2$ inlet, blade stirrer, and bubbler was added 3,000 cc of dry DMAc and 170.0 g of predried LiCl (dried under vacuum at 110°C. for 24 hours). The kettle was then placed in an 80°C. $H_2O$ bath and the contents stirred until a solution was obtained. To the resulting solution there was added 23.64 g (0.2 mole) of purified ODH (dried under vacuum at 110°C. for 3 days). The ODH was washed in with 20 cc dry DMAc. Stirring of the kettle contents in the 80°C. bath continued until a solution formed. Then there was added to this solution 6.61 g (0.05 mole) of purified dry MDH (dried under vacuum at 90°C. for 24 hours) which was washed in with 12 cc of dry DMAc. Continued stirring of the resulting mixture continued until a solution formed. The kettle was then removed from the 80°C. bath and cooled in a 60°C. $H_2O$ bath. Then there was added with stirring 48.53 g (0.25 mole) of dry TDH (dried under vacuum at 110°C. for 3 days). The TDH was washed in with 50 cc of dry DMAc. Stirring continued until a solution was obtained. The kettle was then placed in a −20°C. bath for 1 hour. There was then added 101.5 g (0.5 mole) of distilled TCl which had been powdered. The TCl was washed in with 80 cc of dry DMAc with stirring. Stirring was continued for 20 minutes while the kettle remained in the −20°C. bath. The solution in the kettle warmed to about −5°C. during this 20 minute period. The kettle was then removed from the −20°C. bath and placed in a room temperature $H_2O$ bath while stirring continued. The polymer temperature was not permitted to exceed 50°C. during polymerization. Then there was added with stirring 36.95 g of $Li_2CO_3$ which was washed in with 126 cc of a 50/50 solution of DMAc/$H_2O$ to neutralize the resulting dope which was then heated with stirring for 1 hour using a 70°C. bath.

The resulting dope which contained 4.175% by weight solids ($\eta_{inh}$ 8.35) was degassed, heated to 55°C. and dry jet-wet spun into filaments from a heated (85°C.) spinneret having 20 holes, each of 8-mil (0.203 mm) diameter, into a coagulation bath maintained at 28°C. The bath consisted of water containing 22% by weight of DMAc and was placed 1 inch (25.4 mm) below the spinneret. Well-collapsed filaments were withdrawn from the bath and passed several times around a pair of Godet rolls partially immersed in boiling water. The speed of these rolls was 1.85 times faster than the theoretical jet speed. The jet speed is calculated from the speed at which the dope is pumped from the spinneret and from the number and size of the spinneret holes. The stretch imparted to filaments in this matter is called the "jet stretch". Next the filaments were washed with water (90°C.) and dried. After a finish was applied to the filaments, they were passed over an electrically heated dual-zone hot shoe approximately 30 inches (76.2 cm) in length (initial zone was at 240°C. and the second zone was at 295°C.) during which time an additional stretch of 2.41 times was imparted thereto. The hot-stretched filaments next passed over a 370°C. hot shoe 32 inches (81.28 cm) in length. During this step the filaments were further stretched by a factor of 1.05. The resulting 36 denier/20 filament yarn was collected. Lengths of this yarn were combined to provide 1500 denier yarns. A twist of 11 turns per inch (tpi) or 27.94 turns per meter was then imparted to the 1500 denier yarns in accordance with the optimum twist multiplier of 6.89. Two of the resulting twisted yarns were then plied together using a twist of 11 tpi in the opposite direction from the twist imparted to the filaments of the individual yarns to provide a balanced cord (1500/2 11 × 11). The tenacity (T) and elongation (E) of the untwisted yarns and of the cord were determined and found to be: yarn T/E = 11.8/3.8; cord T/E = 8.0/7.5. The twist efficiency of the yarns in terms of tenacity retained ($T_R$) upon yarn-to-cord conversion was about 68%.

EXAMPLES 2 – 4

These examples illustrate the preparation of other polyhydrazides of the present invention and 1500 denier yarn and 1500/2 11 × 11 cords made therefrom. In each of these examples yarns and cords were prepared using the procedure and technique described in Example 1 with the exception that the mole ratio of ODH to MDH to TDH was varied as follows:

Example 2 ODH to MDH to TDH was 45:5:50.
Example 3 ODH to MDH to TDH was 43:7:50.
Example 4 ODH to MDH to TDH was 43:7:50.

In Example 4 N-methylpyrrolidone was used as the solvent instead of DMAc. In each example the T/E values of the resulting 1500 denier untwisted yarns and the 1500/2 11 × 11 cords made therefrom and the $T_R$ values of the yarns upon yarn-to-cord conversion were determined and are given in the table following the examples.

COMPARATIVE EXAMPLES 5 – 10

These examples illustrate 1500 denier yarns and 1500/2 11 × 11 cords made from ODH, TDH and TCl (example 5) and from ODH, TDH, TCl and a third dihydrazide other than MDH (examples 6–10). In each of these examples yarns and cords were prepared using the procedure and technique described in Example 1 with the following exceptions:

1. In Example 5 the dihydrazide reactants were ODH and TDH in a mole ratio of 50:50.
2. In Example 6 the dihydrazide reactants were ODH, adipic dihydrazide (ADH) and TDH in a mole ratio of 47:3:50.
3. In Example 7 the dihydrazide reactants were ODH, 1,4-benzenedipropionic (BPDH) dihydrazide and TDH in a mole ratio of 40:10:50.
4. In Example 8 the dihydrazide reactants were ODH, succinic dihydrazide (SDH) and TDH in a mole ratio of 47:3:50.
5. In Example 9 the dihydrazide reactants were ODH, SDH and TDH in a mole ratio of 45:5:50.
6. In Example 10 the dihydrazide reactants were ODH, isophthalic dihydrazide (IDH) and TDH in a mole ratio of 40:10:50.

In each example the T/E values of the resulting 1500 denier untwisted yarns and the 1500/2 11 × 11 cords made therefrom and the $T_R$ values of the yarns upon yarn-to-cord conversion were determined and are given in the following table. The $\eta_{inh}$ of each of the polyhydrazides of Examples 1–10 is also given in the Table.

TABLE

| Example | % Aliphatic* Dihydrazide | $\eta_{inh}$ | T/E Yarn | T/E Cord | % $T_R$ |
|---|---|---|---|---|---|
| 1 | 10% MDH | 8.4 | 11.8/3.8 | 8.0/7.5 | 68 |
| 2 | 5% MDH | 9.1 | 14.1/4.1 | 9.0/8.2 | 64 |
| 3 | 7% MDH | 8.8 | 14.4/4.3 | 8.0/7.9 | 56 |
| 4 | 7% MDH | 10.2 | 12.0/3.8 | 7.6/7.6 | 63 |
| 5 | None | 8.4 | 14.2/4.0 | 7.0/7.5 | 49 |
| 6 | 3% ADH | 8.0 | 15.4/4.2 | 7.6/7.8 | 49 |
| 7 | 10% BPDH | 7.4 | 15.4/4.8 | 5.2/7.8 | 34 |
| 8 | 3% SDH | 8.2 | 13.4/4.0 | 7.2/7.4 | 54 |
| 9 | 5% SDH | 7.2 | 12.0/3.7 | 6.2/7.1 | 52 |
| 10 | 10% IDH | 8.1 | 13.2/4.9 | 6.8/7.9 | 52 |

*% aliphatic dihydrazide represents the percentage of the specified dihydrazide based on the total moles of dihydrazide employed.

The results in the table clearly show that yarns made from the polyhydrazides of the present invention suprisingly have improved $T_R$ values upon yarn-to-cord conversion when compared to yarns prepared from similar polyhydrazides, that is, the polyhydrazides of Examples 5–10.

The same relationship of the yarns shown in the Table with regard to $T_R$ values will also exist as the mole ratio of ODH + MDH to TDH used in preparing the polyhydrazides from which the yarns are made increases from 50:50 to 90:10 or decreases from 50:50 to 10:90.

I claim:

1. A fiber-forming polyhydrazide consisting essentially of recurring structural units of the formulas:

(I) 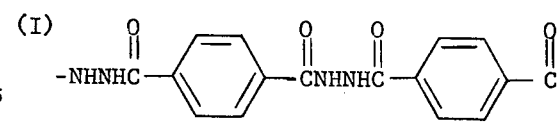

(II) 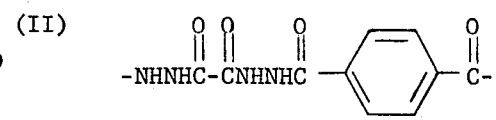

and (III) 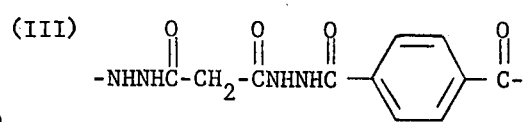

wherein the mole ratio of units (I) to the sum of units (II) and (III) is from 1:9 to 9:1 and the mole ratio of units (III) to the sum of units (I) and (II) is from 3:97 to 15:85.

2. The polyhydrazide of claim 1, wherein from 40 to 60 mole percent of the recurring structural units are units (I).

3. The polyhydrazide of claim 1, wherein 50 mole percent of the recurring structural units are units (I).

4. The polyhydrazide of claim 1 in the form of a filament.

* * * * *